United States Patent
Lang

(10) Patent No.: US 6,857,673 B2
(45) Date of Patent: Feb. 22, 2005

(54) UNIVERSAL CARRIER FOR SPORTS BOARDS

(76) Inventor: Darrell Richard Lang, 27209 N. 65th Pl., Scottsdale, AZ (US) 85262

( * ) Notice: Subject to any disclaimer, the term of this patent is extended or adjusted under 35 U.S.C. 154(b) by 15 days.

(21) Appl. No.: 10/377,484

(22) Filed: Feb. 27, 2003

(65) Prior Publication Data

US 2003/0146635 A1 Aug. 7, 2003

Related U.S. Application Data

(63) Continuation-in-part of application No. 09/894,454, filed on Jun. 28, 2001, now abandoned.
(60) Provisional application No. 60/243,144, filed on Oct. 26, 2000.

(51) Int. Cl.$^7$ ................................................. B65G 7/12
(52) U.S. Cl. ........................... 294/142; 294/15; 294/26
(58) Field of Search ........................... 294/15, 26, 137, 294/142, 143, 145–147, 151–153, 165–168; 211/42, 49.1; D9/434, 455; D34/28

(56) References Cited

U.S. PATENT DOCUMENTS

| | | | | |
|---|---|---|---|---|
| 1,308,031 A | * | 7/1919 | Bell | 211/49.1 |
| 1,448,999 A | * | 3/1923 | Haarberg | 294/15 |
| 1,904,729 A | * | 4/1933 | Radph et al. | 224/612 |
| 2,399,786 A | * | 5/1946 | Caton | 294/153 |
| 2,430,142 A | * | 11/1947 | Roberts | 294/168 |
| 2,485,864 A | * | 10/1949 | Cohen et al. | 294/156 |
| 3,295,733 A | * | 1/1967 | Heal | 294/142 |
| 3,318,453 A | * | 5/1967 | Cavanagh | 211/11 |
| 3,591,063 A | * | 7/1971 | Pearce | 294/137 |
| 4,177,911 A | * | 12/1979 | Griffin | 294/170 |
| 4,190,278 A | * | 2/1980 | Jancik, Jr. | 294/26 |
| 5,733,000 A | * | 3/1998 | Stump | 297/188.06 |
| 5,823,594 A | * | 10/1998 | Hayes et al. | 294/142 |
| 6,309,000 B1 | * | 10/2001 | Pittman | 294/15 |

* cited by examiner

Primary Examiner—Dean J. Kramer

(57) ABSTRACT

A carrier for sport boards such as surf boards. The carrier is a unitary structure formed from a tubular material having a back section which, at its lower end, transitions into a U-shape cradle and a handle. The sport board is received in the cradle and then may be transported by placing the carrier against the side of the user beneath the arm and grasping the handle retaining the board against the side of the user.

10 Claims, 8 Drawing Sheets

UNIVERSAL CARRIER FOR SPORTS BOARDS

The present application is a continuation-in-part application of Ser. No. 09/894,454 filed on Jun. 28, 2001, now abandoned, titled "Universal Carrier For Sports Boards" which is based on provisional application Ser. No. 60/243,144, filed Oct. 26, 2000, titled "Board Buddy—A One-piece Cradle That Is Hand-held for Carrying Surf Boards."

FIELD OF THE INVENTION

The present invention relates to a carrier more particularly a carrier for hand-carrying sports boards such as surf boards, body boards, wake boards and the like.

BACKGROUND OF THE INVENTION

Water sports enthusiasts, such as surfers and those using body boards and wake boards, generally transport the boards to the edge of the water by hand. Boards are carried by grasping an edge of the board and maintaining the board between the body beneath the arm of the user. For smaller boards, this is not particularly difficult. However, boards, particularly surf boards, can have a length up to 11 feet, a width up to 25 inches and may weigh twenty pounds or more. Thus, carrying of the board in the manner described above a long distance, particularly over sandy or rough terrain, can be difficult and laborious. This is particularly true if the individual has a smaller physique as it may be difficult for the user to maintain the board in this position as the arm length of the individual may not be sufficient to allow the user to comfortably grab grasp the lower edge of the board.

There are several devices in the prior are for carrying boards, particularly surf boards. For example, U.S. Pat. No. 5,733,000 shows a combination beach chair and surf board carrier. The support has a strap that can be attached to the surf board to provide for the convenient transportation of the chair and surf board. Other devices utilize straps or slings in similar arrangement.

While these devices may provide the user some assistance when transporting an object such as a surf board, these devices are often themselves unwieldy, requiring the user to attach a strap or sling to the board.

In view of the foregoing, there exists a need for a simple and secure hand-held cradle that can be used in hand-carrying boards such as surf boards of any size.

SUMMARY OF THE INVENTION

Briefly, the present invention is a hand-held carrier that securely supports a surf board when hand-carrying a surf board or other board. The carrier provides both stability and comfort when hand-carrying a surf board. The carrier of the present invention consists of a unitary structure having a back which at its lower end is formed into a "U" which connects to a front spaced from the back. The U-shaped area between the front and back forms a cradle in which the edge of the board may be placed or nested in the carrying position. The upper edge of the front is formed or curved forwardly to provide a handle which the user can conveniently and comfortably grasp.

The back may include a slot or fastener so that the carrier may be stored by hanging it on a vertical surface when not in use. Preferably, the carrier is a one-piece integral unit constructed of a suitable light-weight material such as polycarbonate, acrylic, polyvinylchloride, ABS or similar material by a fabrication process such as injection molding.

In one alternate embodiment of the invention, the carrier has a frame-like structure from tube or similar stock.

BRIEF DESCRIPTION OF THE DRAWINGS

The above and other objects and advantages of the present invention will become more apparent from the following description, claims and drawings in which:

DETAILED DESCRIPTION OF THE DRAWINGS

Figure 1:
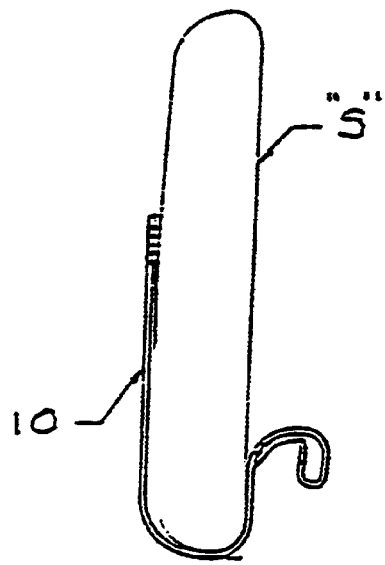
FIG. 1 is a side view of the carrier of the present invention with a surf board shown positioned therein.
Figure 2:
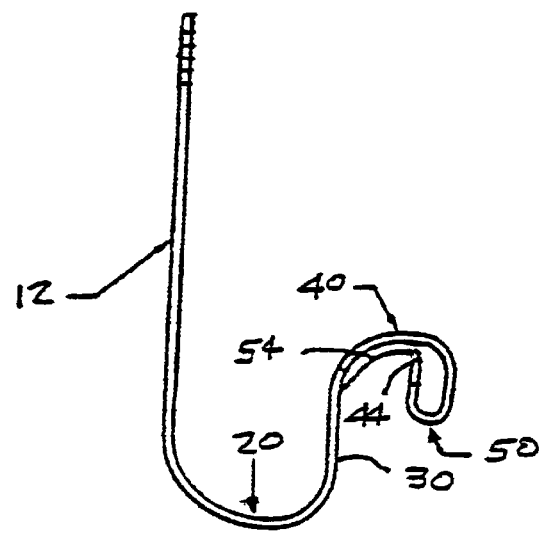
FIG. 2 is a side view similar to FIG. 1 without a surf board in position.
Figure 3:
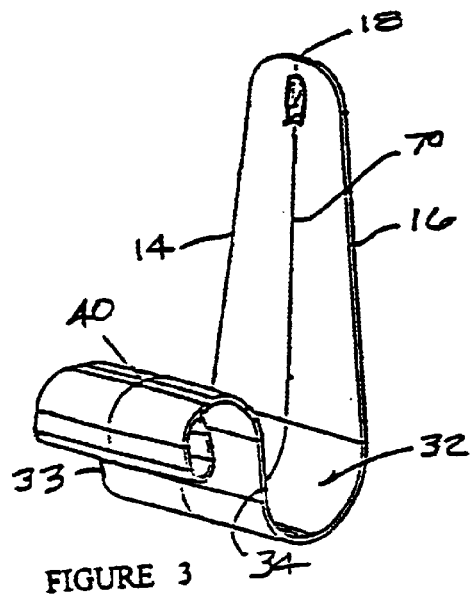
FIG. 3 is a front perspective view of the carrier of the present invention.
Figure 4:
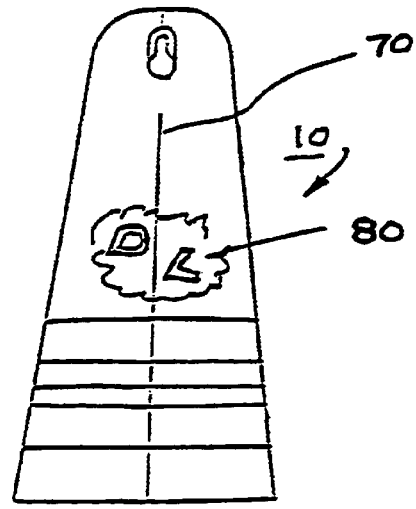
FIG. 4 is a rear view of the carrier.
Figure 5:
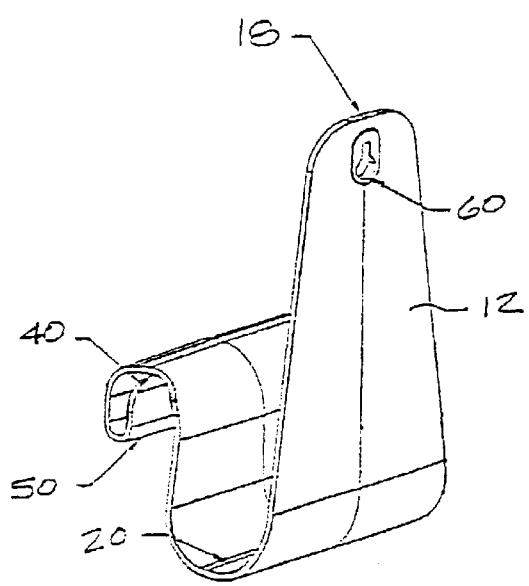
FIG. 5 is a rear perspective view of the carrier of the present invention.
Figure 6:
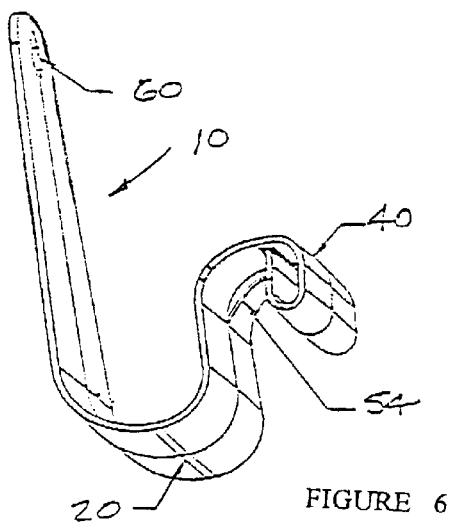
FIG. 6 is a bottom perspective view of the carrier of the present invention.

Turning now to the drawings, the carrier is generally designated by the numeral 10. The carrier has a back or rear section 12 which may be generally rectangular or may be configured having opposite tapered edges 14 and 16 and upper end 18. The bottom of the rear section is formed into an arcuate or bight section 20. The bight is generally semi-circular and forms a continuous curve connecting to front section 30. It will be seen that front section 30 is spaced-apart a distance from the rear section typically between 2.5 and 3.5 inches. The area between the front and rear sections form cradle 32 for receipt of the surf board "S" as seen in FIG. 1. The front and rear sections, as seen in FIGS. 1 to 8, are shown as solid panels.

The front section has opposite side edges 33 and 34 that extend upwardly a distance less than the overall height of the rear wall. Generally the front section extends upwardly approximately one-third to one-half of the height of the rear section 12. The front section is forwardly curved at its upper end at 40. The forward curve 40 extends to a curved section 50 terminating at a reversely bent end 44. The reversely bent end 44 extends and engages the underside of the upper curve 40 of the front section. The curved surface 50 forms a comfortable gripping surface for the user as will be explained hereafter. One or more reinforcing gussets 54 may extend between the sections in the area of the underside of the curve in order to reinforce the structure.

The back section 12 is provided with a hanger 60 near its upper edge. The hanger 60 is preferably in the form of a keyhole slot so that the carrier may be suspended on a hook, nail or fastener on a vertical surface when not in use.

Preferably the carrier 10 of the present invention is constructed by injection molding made from a suitable plastic material such as polycarbonate, acrylic PVC, TAC Fillo, Polly Pro or ABS. These materials have the necessary strength and can be enhanced by the addition of a UV inhibitor. While these materials are preferred, it will obvious that the carrier can also be made from other materials such as light weight aluminum or stainless steel and powder-coated or coated with a rubberized surface to minimize heat conduction and provide comfort to the user.

As discussed above, surf boards come in many different lengths, widths and heights. The larger boards may run up to nine feet long. A surf board is normally carried by the individual with the board held tightly against the side of the body beneath the arm. The user's arm extends over the outer surface of the board and the tips of the fingers grasp the lower edge of the board supporting the weight of the board. This manner of hand-carrying can become uncomfortable particularly if the user must carry the board a great distance or over rough terrain.

Figure 7:
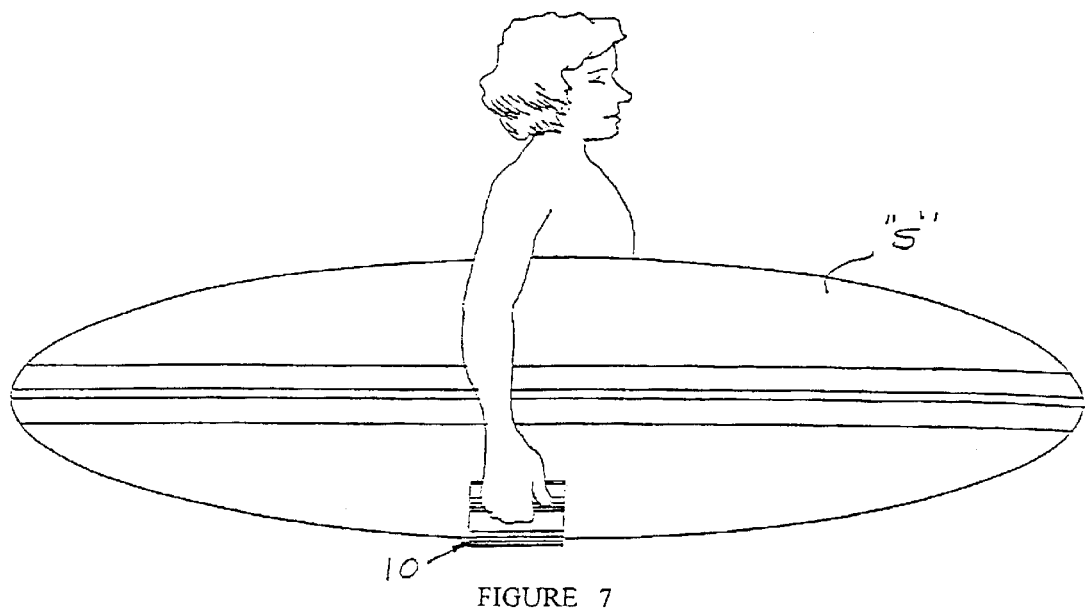
FIG. 7 shows the carrier in a use position viewed from the side.

With the carrier of the present invention, the user will be able to comfortably hand-carry the board safely and comfortably. The carrier receives a surf board, as shown in FIGS. 1 and 7. An edge of the surf board is placed in the cradle portion 32 of the carrier and maintained between the front and rear sections of the carrier. The board will be positioned so that the center of gravity of the surf board is approximately aligned with the center line 70 of the carrier. The user can then comfortably grasp the handle at 50 and lift the board to a position beneath the user's arm maintaining the back of the carrier against the side of the user. It will be seen that the grip 50 provides a comfortable and convenient location for supporting the weight of the board. Further, since the grip 50 is elevated a distance above the lower edge of the board, the user's arm will not be as extended. The carrier 10 permits comfortable transportation of a surf board by individuals such as younger persons not having arms sufficiently long enough to reach around the board and grasp the lower edge while maintaining the board against the side of the user.

The carrier may also be provided with graphic indicia 80 such as a design or a logo of a manufacturer. The carrier may be provided in various colors.

Figure 9:
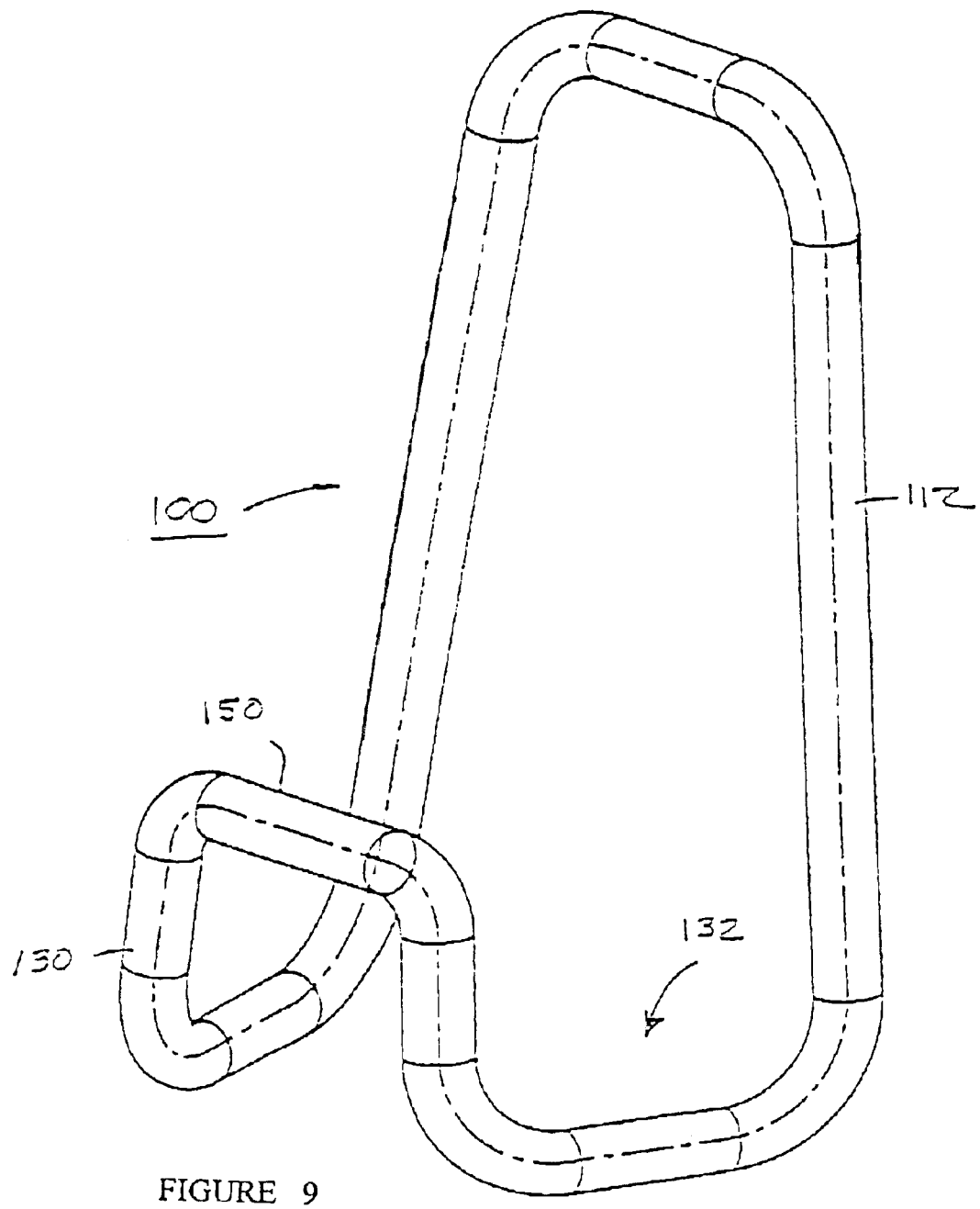
FIG. 9 shows another embodiment of the carrier of the present invention.
Figure 10:
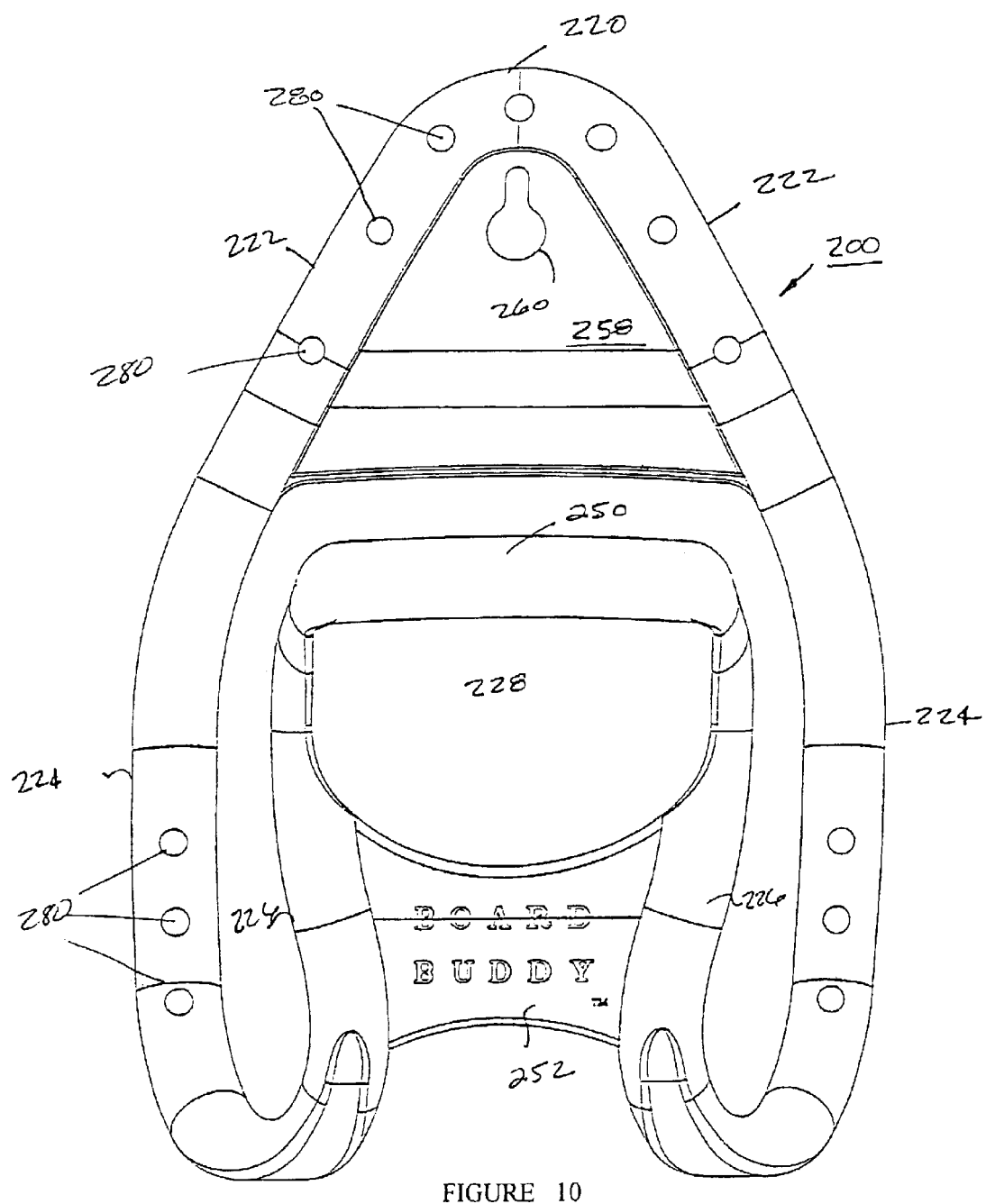
FIG. 10 is a front view of yet another embodiment of the carrier of the present invention.
Figure 11:
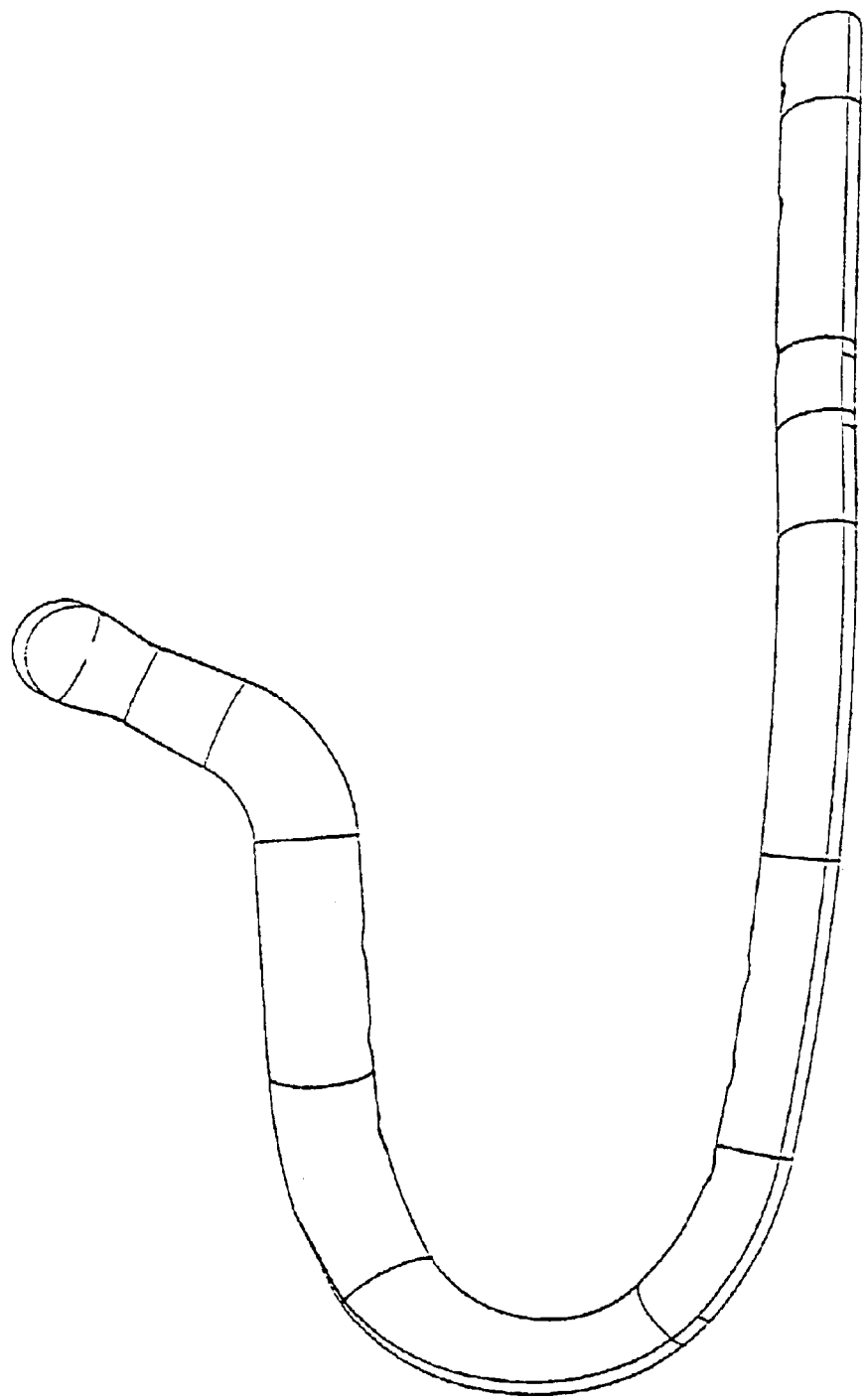
FIG. 11 is a side view of the embodiment of FIG. 10.
Figure 12:
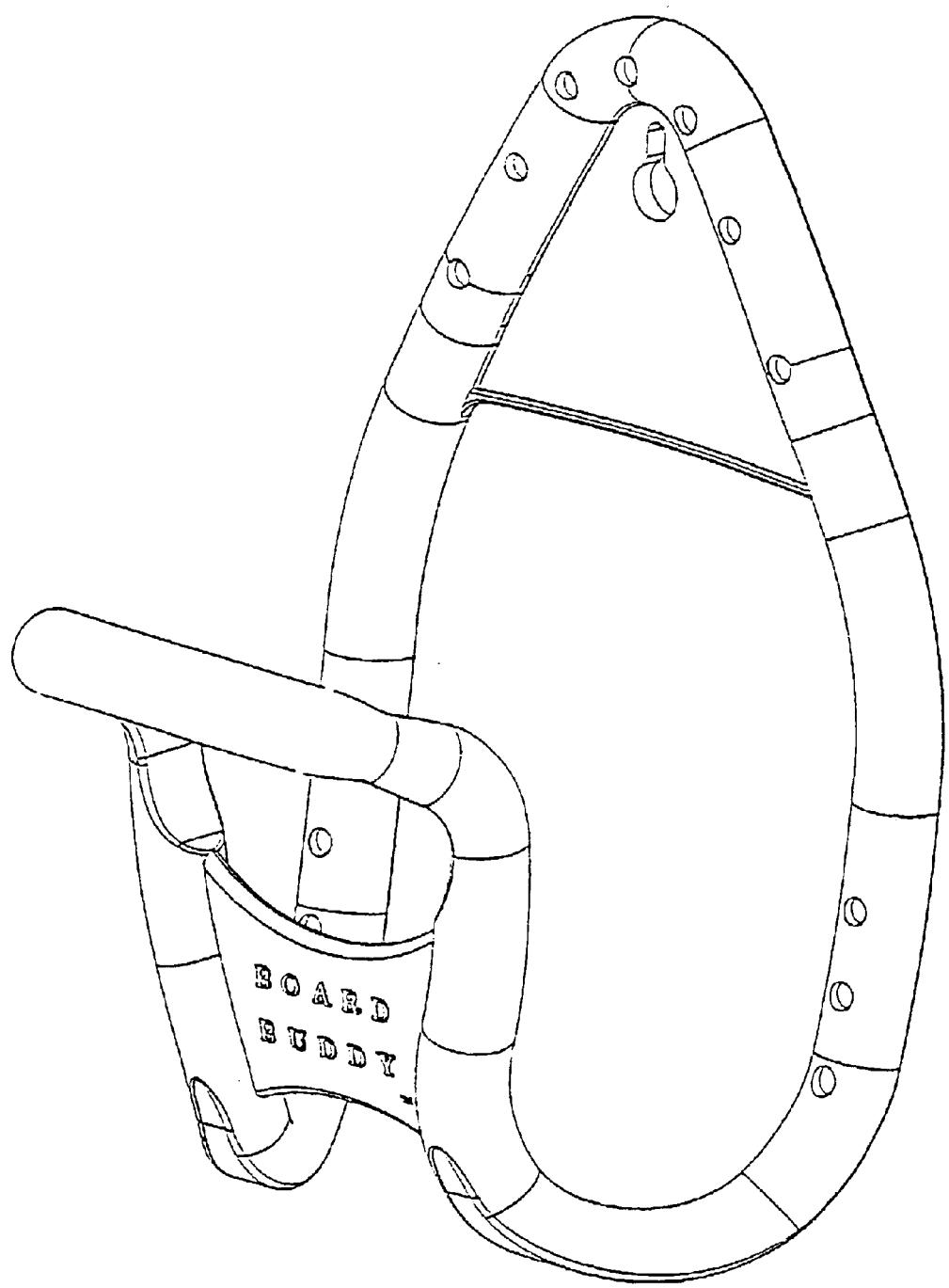
FIG. 12 is a front perspective view of the embodiment of the carrier of FIG. 10.

FIG. 9 shows another embodiment of the invention designated by the numeral 100. The carrier 100 has a back 112, front 130 connected by cradle 132. The front has a handle 150 which may be conveniently gripped when carrying a sport board. The embodiment 100 may be fabricated from formable, strong tube stock of plastic or metal, such as aluminum, and formed by bending or thermal forming into the general shape shown in FIG. 9. The term "tube stock" comprehends various cross-sectional shapes including round, square, oval and the like.

FIGS. 10 to 13 illustrate yet another embodiment of the carrier of the present invention which is generally designated by the numeral 200 in these figures.

Figure 13:
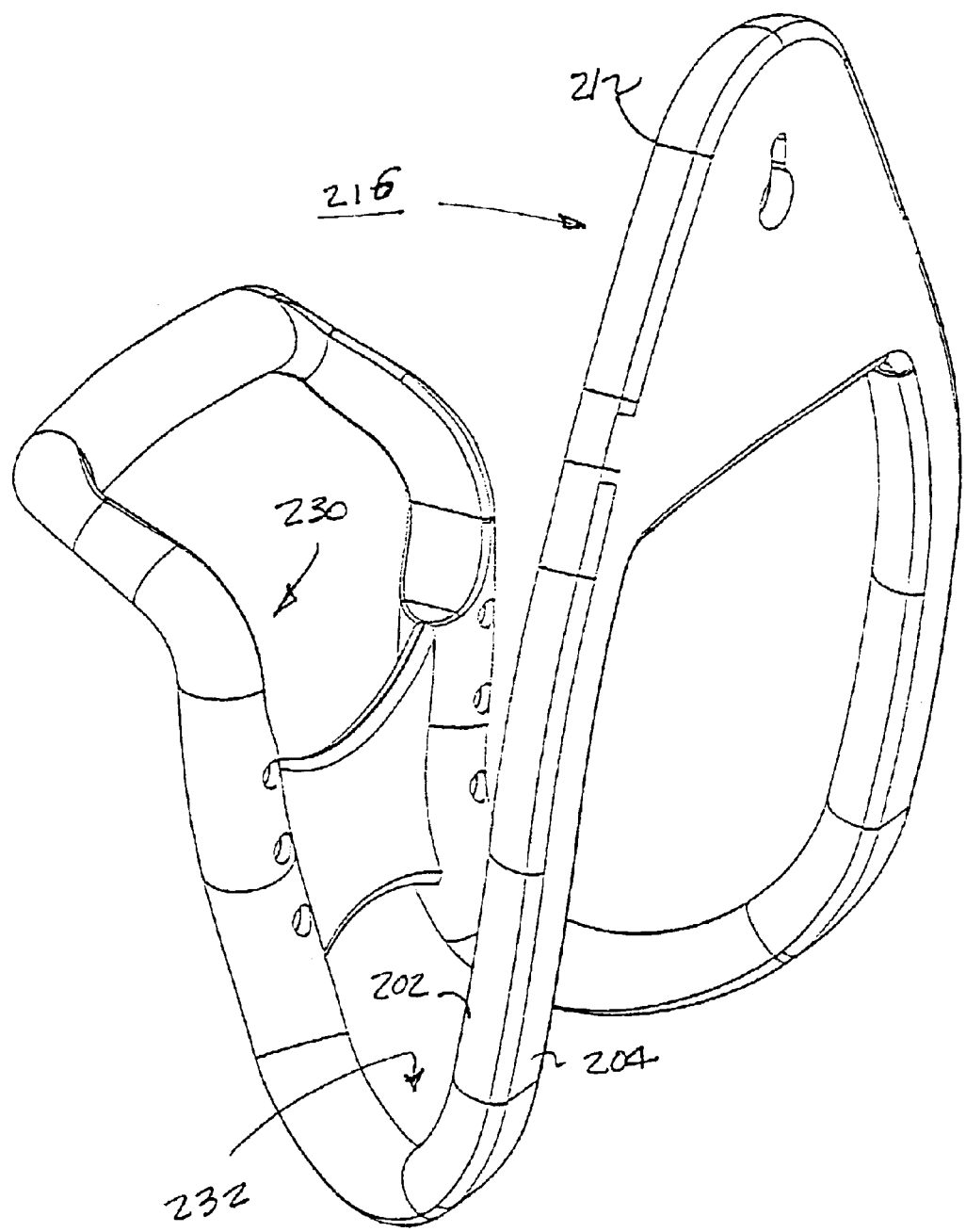
FIG. 13 is a rear perspective view thereof.

In this embodiment, the carrier is fabricated from formable stock such as a tube stock of plastic or metal preferably having a generally semi-circular cross section with a rounded or curved front surface 202 and a flat rear surface 204 as best seen in FIG. 13. The curved frame surfaces are disposed to engage the board when in a carrying position.

The carrier frame 216 is formed having a back section 212, and a front section 230 connected by a cradle 232. The cradle 232 is generally U-shaped having a width of approximately 2" to 3" to accept the edge of a most style surfboards such as a 50/50 board, down rail board or concave down rail styles.

The one-piece frame has an upper end 220 that diverges outwardly at 222 to the opposite sides 224 which extend parallel to one another converging slightly inwardly in the area of the cradle.

The sides of the front 230 extend outwardly and forwardly and handle 250 extends horizontally to provide a grip. A gusset 252 extends between the sides 226 of the front section leaving an opening 228 for the fingers of the user.

Another flat gusset 258 extends across the upper portion of the back section to reinforce the carrier. A keyhole opening 260 is defined in this gusset.

The frame configuration of the carrier provides a generally flat rear surface 204 which is disposed against the side of the body of the user in a use position providing stability and comfort. The curved cross-sectional portion of the tubular frame is disposed away from the body of the user so that the supported board rests against these rounded or curved surfaces 202 to prevent damage to the board. Further cushioning is provided by a plurality of resilient pads 280 disposed at spaced locations on the front of the frame.

Figure 8:
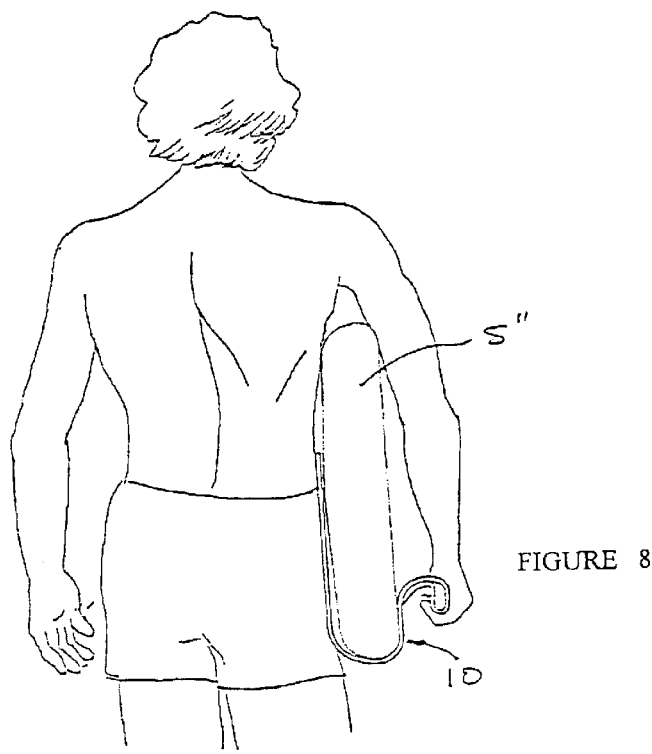
FIG. 8 shows the carrier used with a board viewed from the rear.

The pads 280 are shown as rubber or plastic strips or pads adhesively attached on opposite sides of the cradle and on the upper portion of the front of the frame. In use, the flat rear surface is disposed against the side of the body of the user. Preferably the overall height of the carrier is less than about 12" so the carrier can comfortably be positioned as seen in FIG. 8. The forwardly extending handle is located at an intermediate location with respect to the height of the back section so that the board projects well above the handle and back section resting against the back so the user's arm may extend against the side of the board as seen in FIG. 8 to stabilize the board as it is transported. The open, tubular frame allows sand and grit that may be on the board to drop from the board to the ground.

It will be seen that the present invention provides a secure, hand-held cradle to be used in carrying sport boards of various sizes, types and weights. The device can be inexpensively manufactured and is light weight and may be easily stored in an out-of-the-way position when in use. The device may also be secured on a vertical wall used as a hook for drying towels, wet suits and may be used as a hanger for a surf board.

It will be obvious to those skilled in the art to make various changes, alterations and modifications to the invention described herein. To the extent these various changes, alterations and modifications do not depart from the spirit and scope of the appended claims, they are intended to be encompassed therein.

I claim:

1. A carrier to enable a user to manually transport an elongated sport board in a carrying position along the side of the user, said carrier comprising:
   (a) a front section having a generally tubular frame having upper and lower ends and opposite, spaced-apart sides;
   (b) a back section having a back side and having a generally tubular frame having upper and lower ends, said back section having a height greater than the height of the front section, said height being selected to extend a distance approximate from below the waist of the user along the side of the user to between the user's waist and underarm, said lower ends of said sections being joined at a cradle for receiving said sport board between the front and back sections, said cradle being free of obstructions;
   (c) said tubular frame having a generally flat surface which is disposed against the user in a carrying position and a curved surface which is disposed against the board in the carrying position and being open in the area of the cradle; and (d) the upper end of said front section forming a handle whereby the user may place the sport board in the cradle with the back side of the back section held against a side of the body of the user under the user's arm with the user's arm extending over the carrier and board with the user's hand grasping the handle.

2. The carrier of claim 1 wherein said carrier is fabricated from a plastic material.

3. The carrier of claim 1 wherein said carrier is integrally formed as a unitary structure.

4. The carrier of claim 1 wherein said handle is formed by reversely curving the upper edge of said front section.

5. The carrier of claim 1 further including hanger means associated with said back section.

6. The carrier of claim 5 wherein said carrier is formed by injection molding.

7. The carrier of claim 1 further including reinforcing means extending between the front section and the handle.

8. The carrier of claim 1 further including indicia means carried on at least one of said front and back sections.

9. The carrier of claim 1 wherein said curved surface of said frame is provided with cushioning pads.

10. The carrier of claim 1 wherein the cradle is generally U-shaped having a width of approximately 2" to 3" to accommodate conventional surfboards.

* * * * *